March 2, 1965 R. C. MILLER 3,171,275
PNEUMATIC GAGES
Filed Oct. 12, 1962
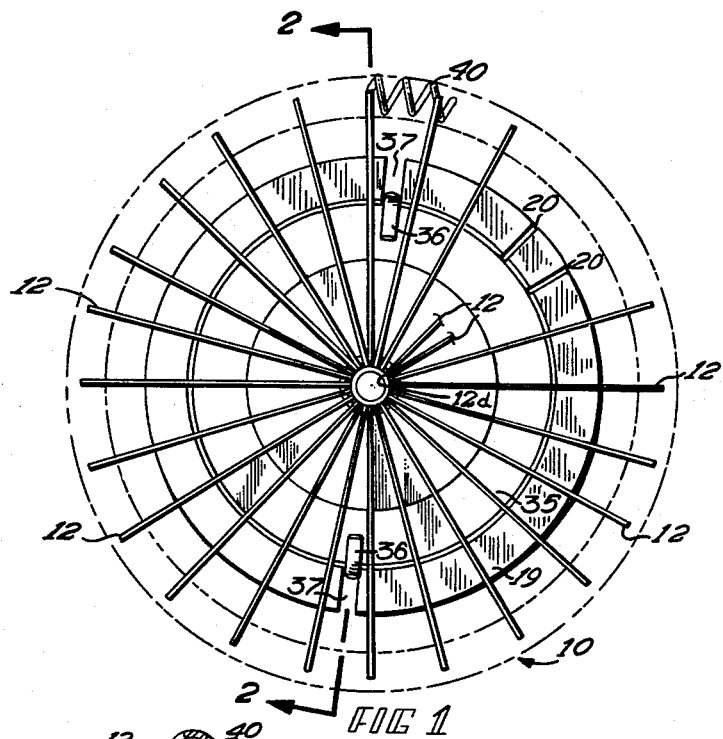
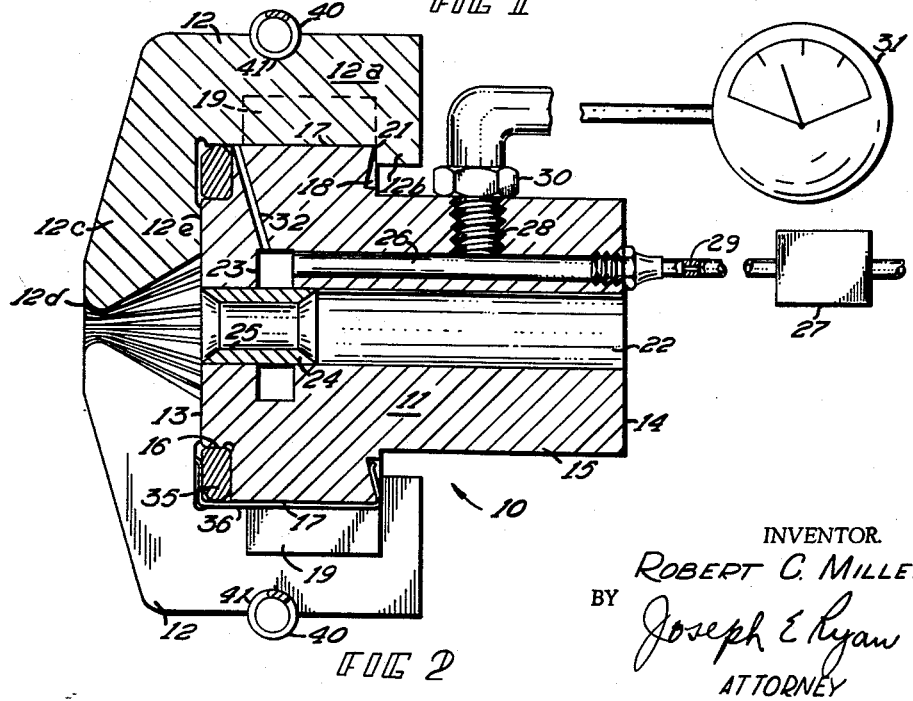
INVENTOR.
ROBERT C. MILLER
BY Joseph E. Ryan
ATTORNEY

United States Patent Office 3,171,275
Patented Mar. 2, 1965

3,171,275
PNEUMATIC GAGES
Robert C. Miller, Coon Rapids, Minn., assignor to
Honeywell Inc., a corporation of Delaware
Filed Oct. 12, 1962, Ser. No. 230,152
10 Claims. (Cl. 73—37.5)

This invention relates to gages and more particularly to gages for detecting variations in the cross-sectional dimension of elongated members. This invention, while not limited thereto, finds particular application in a gage for measuring variations in the cross-sectional dimensions of elongated members having a circular cross section such as cylinders, shafts or rods.

In many instances, it is required that the cross-sectional dimensions of manufactured parts be maintained within very close tolerances. In order to determine whether or not these rigid manufacturing tolerances are being maintained, various types of gages for checking the parts being manufactured have been proposed. Many of these gages were extremely complicated and often very costly. In addition many of the gages previously proposed have required a relatively large amount of handling of the parts being measured such as requiring accurate mounting of the part or considerable manipulation thereof in order to obtain a measurement.

This invention provides a pneumatic gage which is particularly adapted for sensing variations in the cross-sectional dimensions of members having a circular cross-section such as pipes, or shafts to indicate an oversized, undersized or out-or-round member and to detect surface irregularities therein. However, upon reading the following description, it will be apparent that the principle used herein will find application in gages for monitoring the cross-sectional dimensions of parts having various cross-sections other than circular. This invention further provides a gage which is simple and relatively inexpensive and yet provides a very accurate indication of variations in the cross-sectional dimensions of the member being measured.

Therefore an object of my invention is to provide a gage for indicating variations in the cross-sectional dimensions of manufactured parts.

Another object of my invention is to provide a gage which is adapted to monitor substantially the entire surface area of the part to be measured and to thereby indicate variations in the cross-sectional dimension of the part.

A further object is to provide a gage as described above, which requires a minimum amount of handling of the part to be measured and is therefore particularly adaptable for measuring parts being made by a continuous manufacturing process.

A still further object of my invention is to provide a gage as previously described which is simple and relatively inexpensive but is responsive to very small variations in the parts being measured.

These and other objects of the invention will become apparent upon reading the following detailed description of the preferred embodiment of my invention in conjunction with the accompanying drawing wherein:

FIGURE 1 is a front elevational view of a pneumatic gage according to my invention.

FIGURE 2 is a longitudinal cross-sectional view of the pneumatic gage taken generally along line 2—2 of FIGURE 1.

Referring to the drawing, reference numeral 10 generally designates a pneumatic gage for indicating variations in the cross-sectional dimensions of manufactured parts. Gage 10 comprises a mandrel 11 having a plurality of gaging members 12 pivotally mounted about the outer periphery thereof as will be described hereinafter.

Mandrel 11 is of a generally cylindrical shape having a forward end 13 and a rearward end 14. Adjacent rearward end 14 is a portion 15 of reduced diameter which may be adapted (by means not shown) for mounting the gage on a table or other fixture. Adjacent forward end 13 is a portion 16 of reduced diameter. Intermediate portions 15 and 16, mandrel 11 has a first increased diameter portion or hub 17, the forward end thereof forming a shoulder adjacent reduced diameter portion 16. The rearward end of hub 17 has a tapered annular recess 18 the purpose for which will be discussed later herein. Extending outward from hub 17 is a second increased diameter portion or hub 19. The rearward end of hub 19 is co-extensive with the rearward end of hub 17, but the axial length of hub 19 is somewhat less than that of hub 17. Formed in hub 19 and equally spaced about the periphery thereof are a plurality of radially cut and axially extending slots 20. These slots can best be seen in FIGURE 1 wherein portions of two of the gage members 12 have been broken away to better show the structure of the device. Slots 20 may have a depth equal to the annular thickness of hub 19 or may be slightly deeper and thus continue forward as shallow slots in hub 17. The bottom of each of the slots 20 intersects the outer edge of tapered recess 18 to form a knife edge 21 at the rearward end of each of the slots.

Mandrel 11 further has an axially extending cylindrical opening 22 extending therethrough and coaxial therewith. Toward the forward end of the mandrel an annular manifold chamber 23 is formed therein and is coaxial and coextensive with the opening 22. Adjacent the forward end of mandrel 11 a cylindrical insert member 24 is pressed into opening 22. Member 24 extends rearward beyond annular passage 23 and forms an inner wall therefor, thus separating chamber 23 from opening 22. Cylindrical member 24 has a bore 25 extending axially therethrough which is adapted to provide a guide for the member or part to be measured, An axial bore 26 extends through mandrel 11 from rearward end 14 and intersects manifold chamber 23. At the end 14 of mandrel 11, bore 26 is adapted to be connected to a source of fluid such as air at a regulated pressure. This regulated pressure source has been shown schematically at 27. A radial opening 28 in mandrel 11 intersects bore 26 and is adapted, as by a connector 30, to be connected to an indicator such as pressure gage 31 or similar device for sensing variations in the pressure in chamber 23 and bore 26. A restricted orifice 29 is placed in the line connecting the pressure source 27 to bore 26 so that variations in pressure within gage 10 will not materially affect pressures at the source.

Extending substantially radially outward from manifold chamber 23 is a plurality of air escape ports 32 each of which intersects the periphery of hub 17 on a plane perpendicular to the axis of the mandrel and located between reduced diameter portions 16 and the forward end of hub 19. The number of air escape passages 32 is equal to the number of grooves or slots 20 formed in hub 19 and each of the air escape passages 32 intersects the outer periphery of hub 17 in a position axially aligned with one of the slots 20. It will be obvious that if the slots 20 are made deep enough to extend into hub 17, then each of the passages 32 will terminate into one of the slots.

Each of the gaging members 12 is C-shaped and includes a first portion 12a having a relatively short leg portion 12b extending substantially perpendicular thereto at the rearward end thereof. At the forward end of first portion 12a is a finger-like portion 12c also extending substantially perpendicular to first portion 12a. At the end of each of the finger portions 12c is a rounded portion 12d which is adapted to engage the surface of the member to be measured as will be explained further hereinafter. When mounted on the mandrel 11, each of the gaging members 12 is positioned with first portion 12a extending substantially axially along the periphery of the mandrel and accepted into one of the slots 20 in hub 19. Finger portions 12c extend radially inward toward the axis of mandrel 11 and rounded portions 12e co-act to define a circular opening coaxial with opening 22 in the mandrel. Knife edges 21 co-act with the intersection of portions 12a and 12b of the gaging members 12 to provide a pivot for the gaging members. When the members 12 are pivoted inwardly so as to bring first portions 12a into engagement with the bottom of the slots 20 and to cover the open ends of the passages 32, a portion 12e of the finger members 12c abut the forward end of mandrel 11. Thus the surfaces 12e cooperate with the forward end of the mandrel 11 and the pivot points co-operate with the knife edges 21 at the rearward end of hub 17 to prevent axial movement of the gage members 12 with respect to the mandrel. When gaging members 12 are pivoted outwardly, legs 12b will swing into recess 18.

An annular ring 35 is positioned over the reduced diameter portion 16 at the forward end of mandrel 11 and is retained in that position by some means such as spring clips 36 which may be placed in a pair of diametrically opposed slots 37 in hub 19. In the drawing annular ring 35 has been shown to have a diameter substantially equal to the diameter of the inner ends of the slots 20. However, it should be pointed out that it may be desirable to have the rounded portions 12d of gaging members 12 define a somewhat larger diameter circular opening if a larger member is to be measured. If this is the case, ring 35 may be replaced by a similar ring having a larger diameter. This would cause gaging members 12 to be pivoted slightly outward and portions 12e would not abut the forward end of the mandrel.

An annular spiral spring 40 encircles the outer edges of gaging members 12 and is retained in a semi-circular indentation 41 at the outer edge of each of the gaging members. Spring 40 urges the forward end of portion 12a of the gaging members into engagement with the outer periphery of annular ring 35 thus urging the gaging members toward the outer ends of air escape passages 32 and urging finger portions 12c toward the center of the opening defined by portions 12d.

With the description given above, the operation of the pneumatic gage will be apparent. With a source of regulated air pressure connected to bore 26, a predetermined pressure is normally maintained in chamber 23 and bore 26. This pressure will be indicated at gage 31. The amount of air escaping through escape passages 32 will be determined by the pivotal position of gaging members 12 which is in turn determined by the cross sectional dimensions of the member or part being measured.

The diameter of ring 35 may be such that the rounded portions 12d of the gaging members will define a circular opening having a diameter corresponding to the maximum acceptable diameter of the parts or members to be measured. When a member is to be measured it is passed through the gage and is guided by the inner wall 25 of the cylindrical member 24 in bore 22 and passes through the circular opening defined by portions 12d of the gaging members. Any dimension exceeding the maximum acceptable cross-sectional dimensions of the member will cause one or more of the gaging members 12 to be pivoted outwardly from the mandrel thus allowing an additional amount of air to escape through the corresponding passages 32. This will reduce the pressure in chamber 23 and bore 26 and will be indicated by the gage 31. With this arrangement the gage will indicate only an oversized dimension in the part.

However, it should be noted that the diameter of annular ring 35 may be chosen so that portions 12d of the gaging members normally define an opening corresponding to the minimum acceptable cross-sectional dimensions of the parts to be measured. Thus when a part having cross-sectional dimensions exceeding this minimum is passed through the opening defined by portions 12d, the gaging members will be pivoted slightly away from annular ring 35 and from air passages 32 thus allowing an increased leakage of air sufficient to provide a change in the reading at gage 31 indicating an acceptable part. Thus, when a member having a cross-sectional dimension less than the minimum acceptable is passed through the gage, one or more of the gaging members will be unaffected so that the total air leakage is not sufficient to provide a reading at gage 31 to indicate an acceptable part.

In some applications, it has been found desirable to use two of the pneumatic gages 10, one for indicating parts exceeding the maximum allowable cross-sectional dimensions and the other for indicating parts having dimensions below the minimum acceptable dimensions. These two gages are arranged so that the manufactured parts pass first through one and then through the other of the gages. Acting in combination, the two gages thus are effective to detect variations in either sense from the required dimensions of the manufactured parts and thus will indicate an undersized, oversized, or out-of-round part or one having surface irregularities.

While two gages may be used in combination as described above, a single gage may be used to indicate both positive and negative variations from the required cross-sectional dimensions of a manufactured part. In this case, the diameter of annular ring 35 is chosen so that portions 12d of the gaging members normally define an opening slightly smaller than the required size of the part. When a part having the required cross-section is passed through the gage, the members 12 are pivoted slightly to allow a pre-determined leakage of air from the passages 12. Thus, a part having an oversized dimension will further pivot one or more of the gaging members and thus increase the amount of air leakage and reduce the pressure in chamber 23 and bore 26. If the member being measured is undersized, one or more of the gaging members will pivot inwardly and thus reduce the amount of air escaping through the passages and the pressure in chambers 23 and bore 26 will then be increased. Thus the gage may be used to determine both undersize and oversize dimensions of the parts being measured.

While the indicating member has been shown as a pressure gage 31, it is obvious that connector 30 may connect the pneumatic gage 10 to means for automatically rejecting parts which fail to meet the required dimensional tolerances. This would normally involve the use of some type of pneumatic amplifier and a transducer responsive to changes in the pressure in the gage. While it may be desirable to use these components with the gage which comprises this invention, they form no part of the invention and no detailed description thereof will be given.

From the foregoing it will be seen that I have provided a pneumatic gage for monitoring the external surface of elongated members, particularly cylindrical members such as pipes, rods and shafts. As the member to be measured is passed axially through the gage, substantially the entire surface area of the member is monitored to detect variations in the cross-sectional dimensions thereof resulting from the member being oversized, undersized or out-of-round or from surface irregularities in the part. It will further be seen that the gage is extremely simple and will be relatively inexpensive to produce. The only handling of the members to be measured which is required is the pushing of the members axially through the gage.

As pointed out, my invention is particularly adaptable for use in a gage for measuring cylindrical members, but it is obvious that it could be modified to measure members having other cross-sectional configurations without departing from the spirit of the invention. Thus while I have shown a specific embodiment of my invention, it is to be understood that this is for illustrative purposes only and that various modifications thereof may become apparent to those skilled in the art. It is therefore to be understood that the invention is to be limited only by the scope of the appended claims.

I claim as my invention:

1. A gage for measuring cross-sectional dimensions of manufactured parts comprising: a mandrel having an opening therethrough; a plurality of gaging members pivotally mounted on said mandrel around the periphery of said opening, each of said gaging members having a first portion adapted to engage the surface of the part to be measured, said gaging members being positioned on said mandrel so that said first portions thereof co-act to define an opening which is axially aligned with said opening in said mandrel and which has a shape corresponding to the cross-sectional shape of the part to be measured and through which the part is passed while being measured, said first portions of said gaging members being effective to monitor substantially the entire surface of the part being measured as it is passed through said openings, each of said first portion of said gaging members being movable in a direction toward and away from the surface of the part; means yieldably urging said first portions of said gaging members toward the surface of the part; a manifold chamber; means connecting said chamber to a source of fluid at a regulated pressure; a like plurality of fluid escape passages in said mandrel connected to said manifold chamber; each of said gaging members having a second portion thereon adapted to control the flow of fluid through a corresponding one of said passages according to the position of said first portion of said gaging member as determined by the cross-sectional dimensions of the member being measured; and means adapted to connect said manifold chamber to a device which is responsive to changes in fluid pressure in said chamber resulting from pivotal movement of one or more of said gaging members in response to variations in the dimensions of the part being measured.

2. A gage for measuring the cross-sectional dimensions of manufactured parts comprising: a mandrel having a manifold chamber formed therein; means adapted for connecting said manifold chamber to a source of fluid at a regulated pressure; a plurality of fluid passages in said mandrel extending from said manifold chamber and terminating in substantially equally spaced relationship at the surface of said mandrel; a like plurality of gaging members pivotally mounted on said mandrel, said gaging members being positioned about said mandrel and each having a first portion thereon for engaging the surface of the part being measured, said first portions of said gaging members co-acting to define an opening having a shape corresponding to the cross-sectional shape of the part being measured and through which the part is passed while being measured; means yieldably urging said first portions of said gaging members into engagement with the part being measured, said gaging members being effective to monitor substantially the entire surface area of the part being measured as it is passed through said opening; each of said gaging members having a second portion thereon cooperating with one of said fluid passages to control the flow of fluid therethrough according to the pivotal position of said gaging member as determined by the dimensions of the part being measured; and means adapted to connect said manifold chamber to a device which is responsive to a change in fluid pressure in said chamber resulting from a change in the amount of fluid escaping from one or more of said passages when the corresponding gaging members are pivotally moved by a variation in the cross-sectional dimension of the part being measured.

3. A gage for measuring surface dimensions of an elongated member comprising: a mandrel having an opening extending axially therethrough for guiding and allowing axial passage therethrough of the member to be measured; a manifold chamber in said mandrel; a plurality of fluid passages extending from said chamber and terminating at the outer surface of said mandrel means adapted to connect said manifold chamber to a source of fluid at a regulated pressure; a like plurality of gaging members pivotally mounted at the outer surface of said mandrel, each of said gaging members having a first portion extending axially along the outer surface of said mandrel and cooperating with one of said fluid passages to control the escape of fluid therefrom, each of said gaging members further having a finger portion extending inward from the outer surface of said mandrel and adjacent one end thereof, the innermost ends of said finger portions being adapted to contact the surface of the member to be measured and to position said pivoted gaging members according to the dimensions of the member to be measured, said ends of said finger portions defining an opening having a shape corresponding to the cross-sectional shape of the member to be measured and axially aligned with the axial opening in said mandrel; biasing means acting on said gaging members and effective to urge said first portions thereof toward said fluid passages and said finger portions into contact with the surface of the member being measured; and means adapted to connect said chamber to apparatus for sensing a change in pressure therein resulting from a change in the amount of fluid escaping from one or more of said fluid passages and thereby to indicate a dimensional variation in the member to be measured.

4. A gage for measuring surface dimensions of a cylindrical member comprising: a generally cylindrically shaped mandrel having a cylindrical opening extending axially therethrough and substantially coaxial therewith for guiding and allowing axial passage therethrough of the member to be measured; a manifold chamber in said mandrel; a plurality of fluid passages extending from said chamber and terminating in angularly spaced positions at the outer surface of said mandrel; means adapted to connect said manifold chamber to a source of fluid at a regulated pressure; a like plurality of gaging members pivotally mounted on said mandrel, each of said gaging members having a first portion extending axially along the outer surface of said mandrel and cooperating with one of said fluid passages to control the escape of fluid therefrom, each of said gaging members further having a finger portion extending radially inward from the periphery of said mandrel and adjacent one end thereof, the radially innermost ends of said finger portions being adapted to contact the surface of the member to be measured and to pivot said gaging members according to the dimensions of the member, said finger portions defining a generally circular opening coaxial with the cylindrical opening in said mandrel; biasing means acting upon said gaging members and effective to urge said first portions thereof toward said fluid passages and said finger portions thereof toward the center of said circular opening and into engagement with the surface of the member being measured; and means adapted to connect said chamber to apparatus for sensing a change in the amount of fluid escaping from one or more of said fluid passages and thereby to indicate a dimensional variation in the member being measured.

5. A gage for measuring surface dimensions of a cylindrical member comprising: a generally cylindrically shaped mandrel member having a cylindrical opening extending axially therethrough and coaxial therewith for receiving and allowing axial passage therethrough of the member to be measured; an annular manifold chamber in said mandrel; a plurality of radial passages extending from said chamber and terminating in a like plurality of escape ports at the outer surface of said mandrel; means adapted to connect said manifold chamber to a source of fluid at a regulated pressure; a like plurality of gaging members pivotally mounted on said mandrel, each of said gaging members having a first portion extending axially along the outer surface of said mandrel and cooperating with one of said escape ports to control the escape of fluid therefrom, each of said gaging members further having a finger portion extending radially inward from the periphery of said mandrel and adjacent one end thereof, the radially innermost ends of said finger portions being adapted to contact the surface of the member to be measured and defining a generally circular opening coaxial with the cylindrical opening in said mandrel, said finger portions being effective to position said pivoted gaging members with respect to said fluid passages according to the dimensions of the member being measured; biasing means acting upon said gaging members and effective to urge said first portions thereof toward said fluid passages and said finger portions thereof toward the center of said circular opening and into engagement with the surface of the member to be measured; and means adapted to connect said chamber to apparatus for sensing a change in pressure therein resulting from a change in the amount of fluid escaping from one or more of said fluid passages and thereby to indicate a dimensional variation in the member to be measured.

6. A pneumatic gage for measuring the external dimensions of a cylindrical member comprising: a generally cylindrical mandrel having forward and rearward ends and having a generally cylindrical opening extending axially therethrough and substantially coaxial therewith, said opening being adapted to allow axial passage therethrough of a member to be measured and to guide the member in movement therethrough, a plurality of radially cut and axially extending slots formed in said mandrel and substantially equally spaced about the periphery thereof, a like plurality of gaging members, each of said gaging members having a first portion disposed in a corresponding one of said slots and guided thereby and extending substantially axially along said mandrel; means adjacent the rearward end of said first portions adapted for pivotally mounting said gaging members on said mandrel; each of said gaging members further having a finger portion integral with said first portion and extending radially inward from the forward end thereof toward the axis of said mandrel and adjacent the forward end thereof, the radially innermost ends of said finger portions being adapted to contact the surface of the member being measured and defining a circular opening coaxial with the cylindrical opening in said mandrel; a manifold chamber in said mandrel; means adapted to connect said chamber to a source of air at a regulated pressure; a like plurality of air escape passages connected to said chamber and terminating on the surface of said mandrel adjacent the forward end thereof and in axial alignment with one of said slots, said first portion of each of said gaging members being adapted to cooperate with one of said air escape passages to control the escape of air therefrom; yieldable means acting on said gaging members to normally urge said first portions thereof toward said air escape passages and said finger portions into engagement with the member being measured; and means adapted to connect said chamber to a device which is responsive to a change in air pressure in said chamber resulting from a change in the amount of air escaping from one or more of said escape passages when the corresponding gaging members are pivoted by a variation in the cross-sectional dimensions of the member being measured.

7. A gage for measuring the external dimensions of a cylindrical member comprising: a generally cylindrical mandrel having a generally cylindrical opening extending axially therethrough and substantially coaxial therewith, said opening being adapted to allow axial passage therethrough of a member to be measured and to guide the member in movement, said mandrel further having a plurality of radially cut and axially extending slots formed about the outer periphery thereof; a manifold chamber in said mandrel; means adapted to connect said chamber to a source of fluid at a regulated pressure; a like plurality of fluid escape passages connected to said chamber, each of said passages terminating in a corresponding one of said plurality of slots in said mandrel; a like plurality of gaging members, each of said gaging members having a first portion pivotally mounted in a corresponding one of said slots and guided thereby and extending substantially axially along said mandrel, said first portion of each of said gaging members being adapted to cooperate with the fluid passage in the slot in which it is mounted to control the escape of fluid therefrom; each of said gaging members further having a finger portion integral with said first portion and extending radially inward toward the axis of said mandrel and adjacent one end thereof, the radially innermost ends of said finger portions being adapted to contact the surface of the member being measured and defining a circular opening susbtantially coaxial with the cylindrical opening in said mandrel, said finger portions being effective to position said pivoted gaging members according to the dimensions of the member being measured; yieldable means acting on said gaging members to normally urge said first portions thereof against the corresponding air escape passages and said finger portions toward the center of said cylindrical opening and into engagement with the surface of the member being measured; and means adapted to connect said chamber to a device which is responsive to a change in fluid pressure therein resulting from a change in the amount of fluid escaping from one or more of said escape passages when the corresponding gaging members are pivoted by a variation in the surface dimensions of the member being measured.

8. A pneumatic gage for measuring the external dimensions of a cylindrical member comprising: a generally cylindrical mandrel having a generally cylindrical opening extending axially therethrough and substantially coaxial therewith, said opening being adapted to allow axial passage therethrough of a member to be measured and to guide the member in movement therethrough; said mandrel further having a plurality of radially cut and axially extending slots formed about the outer periphery thereof; an annular manifold chamber in said mandrel substantially coaxial with said cylindrical opening therein; means adapted to connect said chamber to a source of air at a regulated pressure; a like plurality of air escape passages connected to said chamber and extending substantially radially outward therefrom, each of said passages terminating adjacent a corresponding one of said plurality of slots in said mandrel; a like plurality of gaging members, each of said gaging members having a first portion pivotally mounted adjacent one end of said portion in a corresponding one of said slots and guided thereby and extending substantially axially along said mandrel, said first portion of each of said gaging members being adapted to cooperate with the air passage adjacent the slot in which it is mounted to control the escape of air therefrom; each of said gaging members further having a finger portion integral with said first portion and at the other end thereof and extending radially inward toward the axis of said mandrel and adjacent one end thereof, the radially innermost ends of said finger portions being adapted to contact the surface of the member being measured and defining a circular opening coaxial with the cylindrical opening in said mandrel; yieldable means acting on said gaging members to normally urge said first portions thereof against the corresponding air escape passages and said finger portions toward the center of said cylindrical opening and into engagement with the member being measured; and means adapted to connect said chamber to a device which is responsive to a change in air pressure therein resulting from a change in the amount of air escaping from one or more of said escape passages when the corresponding gaging members are pivoted by a variation in the surface dimensions of the member being measured.

9. A pneumatic gage for measuring the external dimensions of a cylindrical member comprising: a generally cylindrical mandrel having forward and rearward ends and having a generally cylindrical opening extending axially therethrough and substantially coaxial therewith, said opening being adapted to allow axial passages therethrough of a member to be measured and to guide the member in movement therethrough, said mandrel having a portion of increased diameter extending radially outward therefrom and located intermediate the forward and rearward ends thereof, said mandrel further having a portion of reduced diameter adjacent the forward end thereof; a plurality of radially cut and axially extending slots formed in said increased diameter portion and substantially equally spaced about the periphery thereof; a knife edged surface at the rearward end of each of said slots; a like plurality of substantially C-shaped gaging members, each of said gaging members having a first portion disposed in a corresponding one of said slots and guided thereby and extending substantially axially along said mandrel, each of said gaging members including a leg portion at the rearward end thereof substantially perpendicular to said first portion and extending radially inward adjacent the rearward end of said increased diameter portion, the intersection of said leg portion providing a pivot point on said knife edge surface, each of said gaging members further having a finger portion integral with said first portion and extending radially inward from the forward end thereof toward the axis of said mandrel and adjacent the forward end of said mandrel, the radially innermost ends of said finger portions being adapted to contact the surface of the member being measured and defining a cricular opening coaxial with the cylindrical opening in said mandrel; an annular manifold chamber in said mandrel substantially coaxial with said cylindrical opening therein; means adapted to connect said chamber to a source of air at a regulated pressure; a like plurality of air escape passages connected to said chamber and extending substantially radially outward therefrom, each of said passages terminating on the surface of said mandrel adjacent the forward end thereof and in axial alignment wtih one of said slots and adapted to be valved by pivotal movement of one of said gaging members, said first portion of each of said gaging members being adapted to cooperate with one of said passages to control the escape of air therefrom; an annular ring removably mounted on said reduced diameter portion of said mandrel adjacent the forward end thereof, the outer periphery of said annular ring providing an abutment for the forward end of the first portion of each of said gaging members and thereby defining the radially innermost position of said finger portions of said gaging members; yieldable means acting on said gaging members to normally urge said first portions thereof toward engagement with said annular ring and toward said air escape passages; and means adapted to connect said chamber to a device which is responsive to a change in air pressure in said manifold chamber resulting from a change in the amount of air escaping from one or more of said escape passages when the corresponding gaging members are pivoted by a variation in the cross-sectional dimensions of the member being measured.

10. A pneumatic gage for measuring the external dimensions of a cylindrical member comprising: a generally cylindrical mandrel having forward and rearward ends and having a generally cylindrical opening extending axially therethrough and substantially coaxial therewith, said opening being adapted to allow axial passage therethrough of a member to be measured and to guide the member in movement therethrough, said mandrel having a first annular hub portion extending radially outward therefrom and located intermediate the forward and rearward ends thereof, said first hub portion having a tapered annular recess formed in the rearward end thereof; a second annular hub portion extending radially outward from said first hub portion and having a rearward end coextensive with the rearward end of said first hub portion, said second hub portion having an axial length somewhat less than that of said first hub portion; a plurality of radially cut and axially extending slots formed in said second hub portion and substantially equally spaced about the periphery thereof, the radial depth of said slots being at least equal to the annular width of said second hub portion, the intersection of said annular recess and the rearward ends of said slots forming a plurality of knife edged surfaces at the rearward end of said first hub portion, said mandrel further having a reduced diameter portion adjacent said forward end thereof; a like plurality of substantially C-shaped gaging members, each of said gaging members having a first portion disposed in a corresponding one of said slots and guided thereby and extending substantially axially along said mandrel, each of said gaging members including a leg portion at the rearward end thereof substantially perpendicular to said first portion and extending radially inward adjacent said annular recessed portion, the intersection of said first portion and said leg portion providing a pivot point on said knife edge surface, each of said gaging members further having a finger portion integral with said first portion and extending radially inward from the forward end thereof toward the axis of said mandrel and adjacent the forward end of said mandrel, the radially innermost ends of said finger portions being adapted to contact the surface of the member being measured and defining a circular opening coaxial with the cylindrical opening in said mandrel; an annular manifold chamber in said mandrel substantially coaxial with said cylindrical opening therein; means adapted to connect said chamber to a source of air at a regulated pressure; a like plurality of air escape passages connected to said chamber and extending substantially radially outward therefrom, each of said passages terminating on the surface of said first hub portion adjacent the forward end thereof and in axial alignment with one of said slots in said second hub portion and adapted to be valved by pivotal movement of one of said gaging members, said first portion of each of said gaging members being adapted to cooperate with one of said air escape passages to control the escape of air therefrom; an annular ring removably mounted on said reduced diameter portion of said mandrel adjacent the forward end thereof, the outer periphery of said annular ring providing an abutment for the forward end of the first portion of each of said gaging members and thereby defining the radially innermost position of said finger portions of said gaging members; yieldable means acting on said gaging members to normally urge said first portions thereof into engagement with said annular ring and toward said air escape passages; and means adapted to connect said manifold chamber to a device which is responsive to a change in air pressure in said chamber resulting from a change in the amount of air escaping from one or more of said escape passages when the corresponding gaging members are pivoted by a variation in the cross-sectional dimensions of the member being measured.

References Cited by the Examiner
UNITED STATES PATENTS 2,477,399 7/49 Aller _____ 73—37.5
2,691,827 10/54 Aller.
2,852,852 9/58 Byrkett et al. _____ 33—174

ISAAC LISANN, *Primary Examiner.*